United States Patent
Lee et al.

(10) Patent No.: US 8,596,507 B2
(45) Date of Patent: Dec. 3, 2013

(54) STORAGE APPARATUS FOR VEHICLE

(75) Inventors: Seung Mok Lee, Hwaseong-si (KR); Nae Ung Jang, Hwaseong-si (KR); Hee Chan Yang, Hwaseong-si (KR); Dong Eun Cha, Seongnam-si (KR); Nam Cheol Kim, Suwon-si (KR); Kwang Jae Choi, Hwaseong-si (KR); Jo Han Kim, Hwaseong-si (KR); Yong Won Jeong, Hwaseong-si (KR); Seung Hwan Lee, Hwaseong-si (KR); Cheol O Kim, Hwaseong-si (KR); Ki Tae Kim, Hwaseong-si (KR); Myung Eun Kim, Hwaseong-si (KR); Hun Soo Kim, Hwaseong-si (KR); Hoo Taek Cho, Yongin-si (KP); Jeong Ho Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 129 days.

(21) Appl. No.: 13/323,555

(22) Filed: Dec. 12, 2011

(65) Prior Publication Data
US 2013/0087590 A1    Apr. 11, 2013

(30) Foreign Application Priority Data
Oct. 5, 2011  (KR) .......................... 10-2011-0101152

(51) Int. Cl.
*B60R 9/00* (2006.01)
*B60R 11/00* (2006.01)
*B60R 5/00* (2006.01)

(52) U.S. Cl.
USPC ........... 224/489; 224/488; 224/490; 224/491; 296/37.1

(58) Field of Classification Search
USPC ......... 224/489, 490, 491, 488, 495, 497, 504, 224/507, 924, 42.23; 293/117, 119; 414/466; 296/37.1, 26.09
See application file for complete search history.

(56) References Cited

U.S. PATENT DOCUMENTS

| | | | | |
|---|---|---|---|---|
| 2,490,014 A | * | 12/1949 | Brand | 296/26.09 |
| 2,545,269 A | * | 3/1951 | Ford | 312/334.13 |
| 2,953,287 A | * | 9/1960 | Werner | 224/496 |
| 4,089,554 A | * | 5/1978 | Myers | 296/37.1 |
| 4,312,620 A | * | 1/1982 | Muschalek, Jr. | 414/466 |
| 4,570,986 A | * | 2/1986 | Sams | 293/117 |
| 4,676,415 A | * | 6/1987 | Kennedy | 224/489 |
| 5,135,274 A | * | 8/1992 | Dodd | 293/117 |
| 5,823,585 A | * | 10/1998 | Tanguay | 293/106 |
| 6,474,715 B2 | * | 11/2002 | Fukushima et al. | 296/37.1 |

(Continued)

FOREIGN PATENT DOCUMENTS

| | | | | |
|---|---|---|---|---|
| DE | 19538734 A1 | * | 5/1996 | B60R 19/48 |
| DE | 10124375 C1 | * | 11/2002 | B60R 5/04 |

(Continued)

*Primary Examiner* — Nathan Newhouse
*Assistant Examiner* — Lester L Vanterpool
(74) *Attorney, Agent, or Firm* — Morgan, Lewis & Bockius LLP

(57) ABSTRACT

A storage apparatus for a vehicle may include a rear bumper having a back beam mounted under an inner space thereof, and a storage case provided in a space above the rear bumper, having a portion exposed to the outside formed so as to coincide with an outer surface of the rear bumper, and drawn-out/drawn-in by being slid to the outside in a state in which a load is supported above the back beam.

11 Claims, 4 Drawing Sheets

(56) References Cited

U.S. PATENT DOCUMENTS

| | | | |
|---|---|---|---|
| 6,575,509 B1* | 6/2003 | Golden | 293/119 |
| 6,644,707 B2* | 11/2003 | McLaughlin et al. | 296/26.09 |
| 7,121,597 B2* | 10/2006 | Chuang | 293/117 |
| 7,281,745 B1* | 10/2007 | Meinke et al. | 296/26.1 |
| 7,347,474 B2* | 3/2008 | Shagbazyan | 296/26.1 |
| 8,256,807 B2* | 9/2012 | Lucas | 293/106 |
| 8,302,829 B2* | 11/2012 | Lee et al. | 224/489 |
| 2002/0105201 A1* | 8/2002 | Melotik et al. | 296/26.09 |
| 2007/0102465 A1* | 5/2007 | Wezyk et al. | 224/321 |
| 2008/0006667 A1* | 1/2008 | Bergerhoff et al. | 224/533 |

FOREIGN PATENT DOCUMENTS

| | | |
|---|---|---|
| JP | 2001-334879 A | 12/2001 |
| JP | 2007-245959 A | 9/2007 |
| JP | 4332827 B2 | 7/2009 |

* cited by examiner

STORAGE APPARATUS FOR VEHICLE

CROSS-REFERENCE TO RELATED APPLICATION

This application claims under 35 U.S.C. §119(a) the priority of Korean Patent Application No. 10-2011-0101152 filed Oct. 5, 2011, the entire contents of which application is incorporated herein for all purposes by this reference.

BACKGROUND OF INVENTION

1. Field of Invention

The present invention relates to a storage apparatus for a vehicle capable of increasing a storage space by drawing-out an inner space of a rear bumper as a storage structure and more increasing a storage space by using the drawn-out rear bumper as a step and a bench and changing a structure of a drawn-out rear bumper.

2. Description of Related Art

FIG. 1 shows a vehicle in which a space of a trunk room 1 is provided with a storage case 2. The structure of the related art shown in FIG. 1 has a structure opening a trunk lid 3 and drawing-out the storage case 2. In order to store stored goods, it is complicated to open the trunk lid an then, store the stored goods. In addition, when it is not easy to store the stored goods due to pollution or humidity of the space of the trunk room 1, the use of the trunk room 1 may be degraded.

Further, the storage structure of the related art shown in FIG. 2 has a structure in which a rear bump 11 is used as a door of the storage space 12. The storage structure has a structure in which the rear bump 11 is opened and then, an article 13 may be stored in a storage space 12 provided under the vehicle.

However, as shown in FIG. 2, the structure according to the related art has a structure using the rear bumper 11 as the door of the storage space 12. According to the structure of the related art shown in FIG. 1, an inner space of the rear bump 11 corresponding to a spare space is not used as the storage structure and thus, a storage function of the bumper is insufficient.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a storage apparatus for a vehicle capable of positively using a spare space of a vehicle by drawing-out an inner space of a rear bumper corresponding to the spare space as a storage structure and using the drawn-out rear bumper as a step and a bench.

Various aspects of the present invention provide for a storage apparatus for a vehicle capable of increasing a storage space by changing a structure of a drawn-out rear bumper.

Various aspects of the present invention provide for a storage apparatus including a rear bumper having a back beam mounted under an inner space thereof, and a storage case provided in a space above the rear bumper, having a portion exposed to the outside formed so as to coincide with an outer surface of the rear bumper, and drawn-out/drawn-in by being slid to the outside in a state in which a load is supported above the back beam.

The storage case may include a support tray having the storage space provided therein and slidably moving while being supported above the back beam, and a drawing-out portion exposed to the outside while being mounted at an end portion of the support tray and formed to have a predetermined width so as to use the outside surface thereof as a step or a bench at the time of drawing-out the storage case.

The drawing-out portion may include a tray cover mounted above a support tray and providing a space communicating with the storage space, and a bumper cover mounted so as to cover the outside of the tray cover and finished so as to coincide one end and the other end thereof with the outer surfaces above and under the rear bumper, respectively.

A buffer space may be provided between the tray cover and the bumper cover.

The storage apparatus for a vehicle may further include a guide bracket provided in the space above the rear bumper in a state of covering and supporting a portion of the storage case and mounted so as to be supported to the rear end panel and the back beam.

A bottom surface of the guide bracket may be mounted to be seated to a top end of the back beam, a front surface of the guide bracket may be mounted to be supported to a rear end panel, and a top portion of the guide bracket may be mounted to be support to a top portion of the rear bumper, One end of the guide bracket may be provided with a stopper portion to be bent downward to support the inside of the storage case at the time of drawing-out the storage case.

The other end of the guide bracket may be provided with a load support portion to extend backward to support a load of the storage case at the time of drawing-out the storage case.

The storage apparatus for a vehicle may further include a support bracket mounted to be fixed to the bottom surface of the load support portion and the rear surface of the back beam so as to support the load of the storage case.

A support tray may be provided with a hinge at a boundary portion with the drawing-out portion and the drawing-out portion may rotate downward through the hinge.

A bottom surface of the guide bracket mounted under the drawing-output portion may be protrudedly formed with a stopper.

When the drawing-out portion rotates downward, an opened top surface of the tray cover provided at both sides of the hinge and a top surface of the inside of the guide bracket may have a flat shape.

An inner space in front of the rear bumper may be provided with a rear floor panel, the rear floor panel may be provided with a guide rail mechanism, and a top portion of the guide rail mechanism may be mounted with the storage case to be mounted above the back beam.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 3 to 8, a storage apparatus for a vehicle according to various embodiments of the present invention has a structure using an inner space of a rear bumper 10 of a vehicle corresponding to a spare space while a portion of the rear bumper 10 of a vehicle is drawn-out and drawn-in. The storage apparatus for a vehicle is configured to include the rear bumper 10 having a back beam 11 mounted under the inner space thereof and a storage case 20 provided in a space above the rear bumper 10, having a portion exposed to the outside formed so as to coincide with an outer surface of the rear bumper 10, and drawn-out/drawn-in by being slid to the outside in a state in which a load is supported above the back beam 11.

That is, the storage case 20 having the storage space 21 is mounted in the space provided above the rear bumper 10 and the storage space 21 in the vehicle is increased by drawing-out the storage case 20 to the outside while being supported above the back beam 11, thereby maximizing an article storage function.

Figure 1:
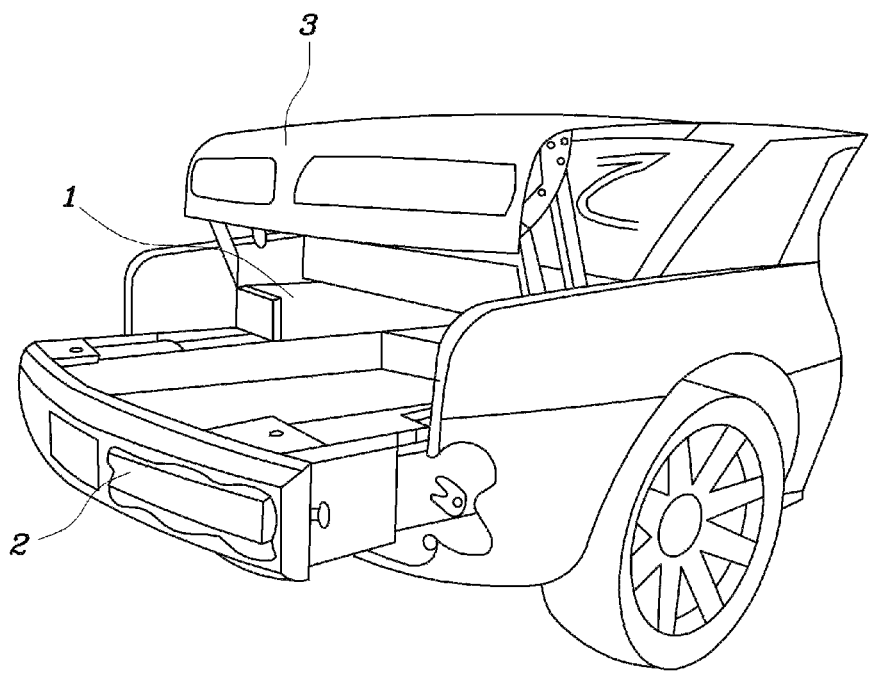
FIG. 1 is a diagram for describing a storage apparatus for a vehicle according to the related art.
Figure 2:
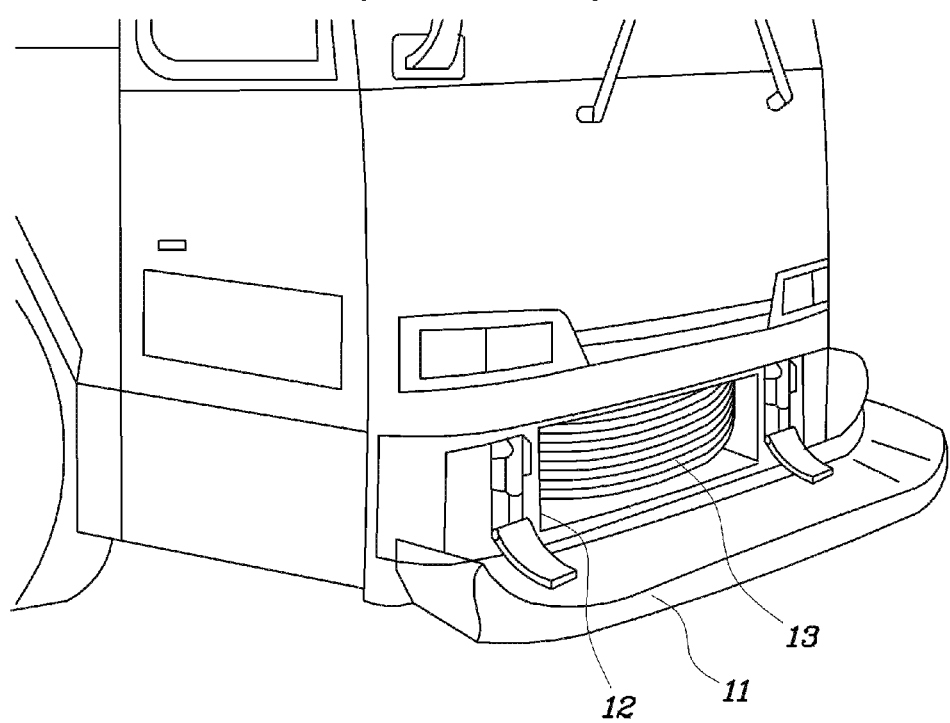
FIG. 2 is a diagram for describing another storage apparatus for a vehicle according to the related art.
Figure 3:
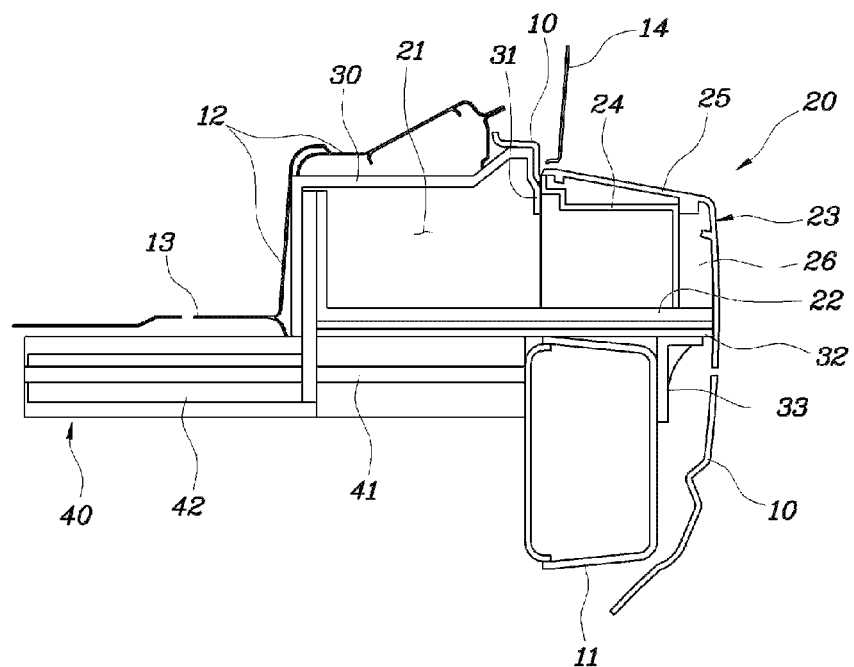
FIG. 3 is a diagram showing a storage case drawing-in structure of an exemplary storage apparatus according to the present invention.
Figure 4:
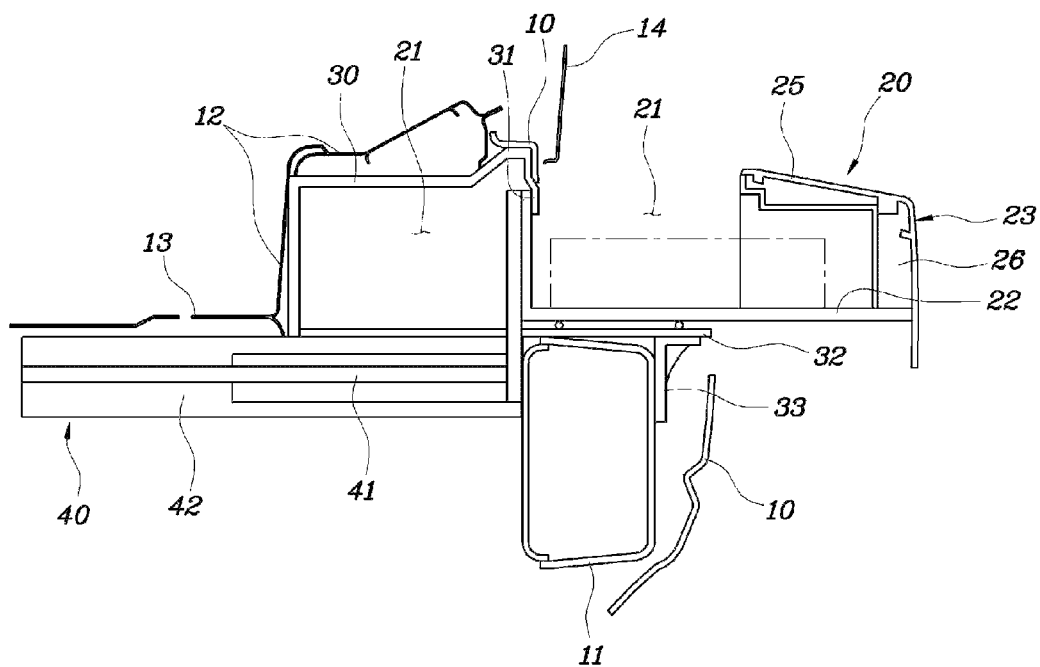
FIG. 4 is a diagram showing a storage case drawing-out structure of an exemplary storage apparatus according to the present invention.
Figure 5:
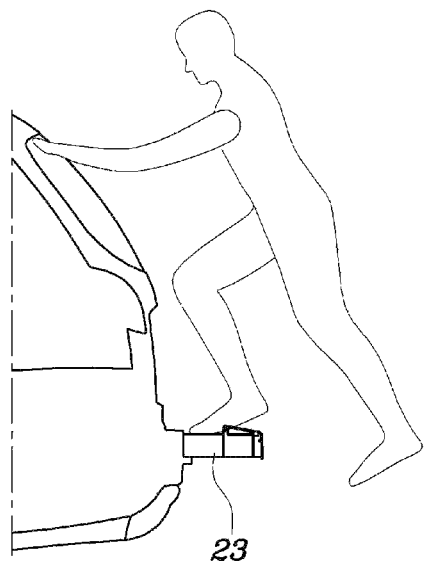
FIG. 5 is a diagram showing a state in which an exemplary bumper cover is used as a step at the time of drawing-out the storage case according to the present invention.
Figure 6:
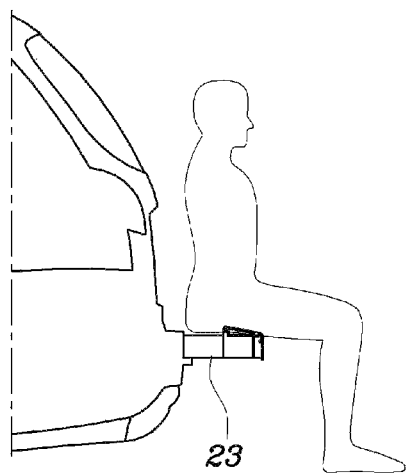
FIG. 6 is a diagram showing an exemplary state in which the bumper cover is used as a bench at the time of drawing-out the storage case according to the present invention.

As shown in FIGS. 3 and 4, according to various embodiments of the present invention, the storage case 20 has a structure configured to include a support tray 22 having the storage space 21 provided therein and slidably moving while being supported above the back beam 11 and a drawing-out portion 23 exposed to the outside while being mounted at an end portion of the support tray 22 and formed to have a predetermined width so as to use the outside surface as a step or a bench at the time of drawing-out the storage case 20, thereby storing and accepting the articles in the storage space 21 provided above the support tray 22 at the time of drawing-out the storage case 20.

In this case, the support tray 22 serves to provide the storage space 21 in the drawing-out and drawing-in state and is not limited to a shape described herein. Therefore, the support tray 22 may be modified in several shapes so as to provide various types of storage spaces 21.

The drawing-out portion 23 is configured to include a tray cover 24 mounted above the support tray 22 in a framework type and providing the space communicating with the storage space 21 and a bumper cover 25 mounted so as to cover the outside of the tray cover 24 and finished so as to coincide one end and the other end thereof with the outer surfaces above and under the rear bumper 10, respectively. The article may also be stored in the space provided in the storage space 21 and the inside of the tray cover 24, thereby further increasing the storage space 21.

Further, the bumper cover 25 is provided as a partial shape of the rear bumper 10 when drawing the storage case 20 in the rear bumper 10 and the bumper cover 25 is used as the step or the bench when drawing the storage case 20 to the outside of the rear bumper 10. Meanwhile, articles may be put on the opened bumper cover 25.

Herein, a buffer space 26 is provided between the tray cover 24 and the bumper cover 25 to protect a passenger by absorbing impact at the time of a rear collision accident.

Further, according to various embodiments of the present invention, a guide bracket 30 is provided in the space above the rear bumper 10 in a state of covering and supporting a portion of the storage case 20 and mounted so as to be supported to the rear end panel 12 and the back beam 11.

The bottom surface of the guide bracket 30 is mounted to be seated to the top end of the back beam 11, the front surface of the guide bracket 30 is mounted to be supported to the rear end panel 12, and the top portion of the guide bracket 30 is mounted to be support to the top portion of the rear bumper 10 mounted under a trunk lid 14.

That is, the guide bracket 30 is simultaneously fixed to the rear end panel 12 and the back beam 11, thereby supporting the load applied to the storage apparatus by the drawing-out operation at the time of drawing-out the storage case 20.

In this configuration, the storage case 20 is slid to the inside of the guide bracket 30 so as to be drawn-out and drawn-in. The top surface of the inside of the guide bracket 30 or the bottom surface of the support tray 22 may be provided with a connection structure such as a roller, a bearing, or the like, so as to stably implement sliding movement in the state in which the support tray 22 and the guide bracket 30 contact each other.

In addition, the guide bracket 30 and the support tray 22 are separately provided with a locking apparatus, thereby maintaining the storage case 20 in a constrained state.

Further, one end of the guide bracket 30 is provided with a stopper portion 31 to be bent downward, thereby supporting the inside of the storage case 20 at the time of drawing-out the storage case 20.

That is, when drawing-out the storage case 20, the top end vertically formed in front of the storage case 20 contacts the stopper portion 31 and is supported thereto to prevent the storage case 20 from being excessively drawn-out beyond a defined range and prevent the storage case 20 from separating due to the rotation to the outside of the rear bumper 10 by the load of the storage case 20.

In addition, the other end of the guide bracket 30 is provided with a load support portion 32 to extend backward, thereby supporting the load of the storage case 20 at the time of drawing-out the storage case 20.

That is, the back beam 11 and the other end of the guide bracket 30 support the load of the storage case 20 when drawing-out the storage case 20. In this case, the load support portion 32 is formed so as to further extend in the drawing-out direction of the storage case 20 to secure the support rigidity in the vertical direction, thereby more firmly and stably supporting the load applied to the storage case.

Various embodiments of the present invention have a structure configured to further include a support bracket 33 mounted to be fixed to the bottom surface of the load support portion 32 and the rear surface of the back beam 11 so as to support the load of the storage case 20. In this case, the support bracket 33 is formed to have a cross section in a ¬-letter shape and thus, the support bracket 33 is formed to have a structure fixedly mounted to both of the rear surface of the back beam 11 and the bottom surface of the guide bracket 30, thereby more easily secure the support rigidity in the vertical direction.

Figure 7:
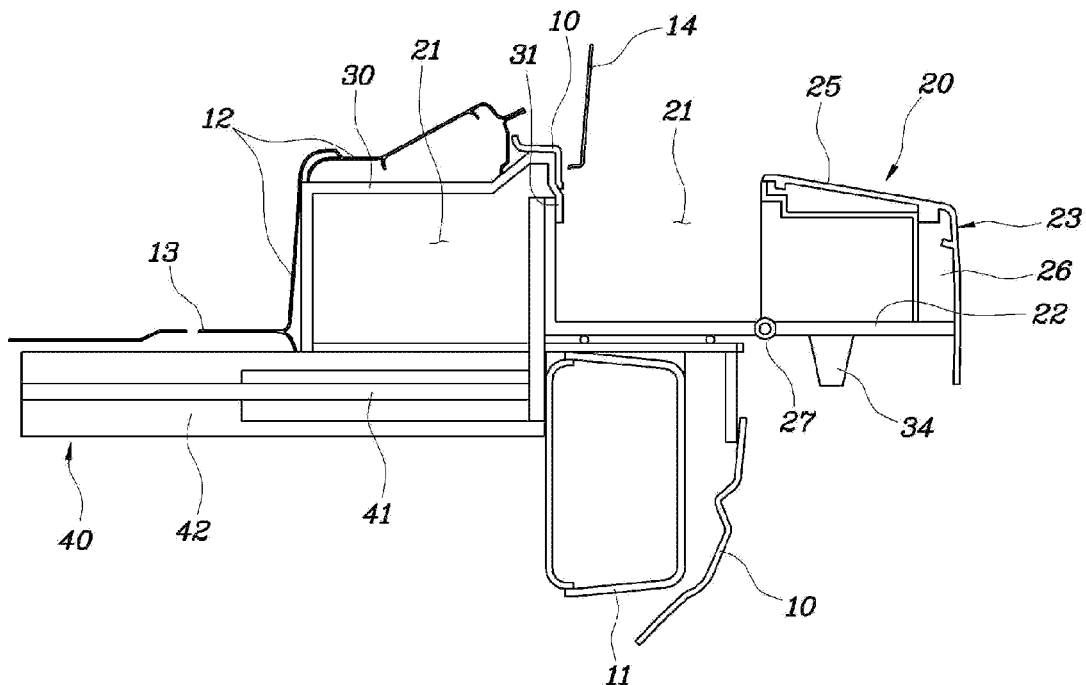
FIG. 7 is a diagram showing an exemplary state before a hinge of the storage apparatus according to the present invention is rotated.
Figure 8:
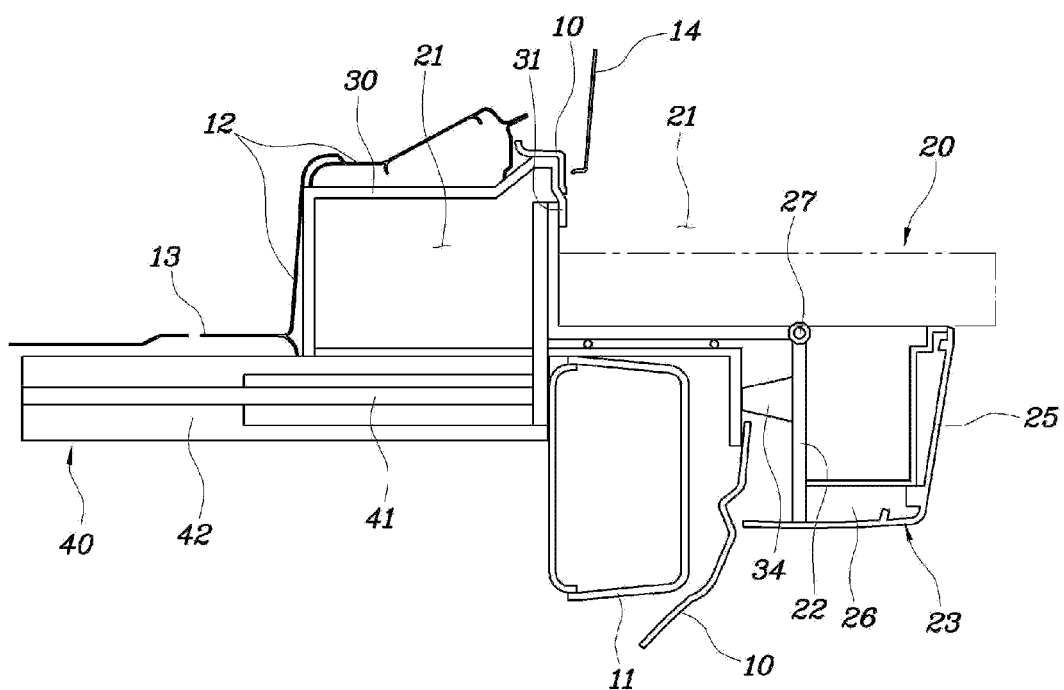
FIG. 8 is a diagram showing an exemplary state after the hinge of the storage apparatus according to the present invention is rotated.

Meanwhile, as shown in FIGS. 7 and 8, according to various embodiments of the present invention, the support tray 22 is provided with a hinge 27 at a boundary portion 23 with the drawing-out portion 23 and the drawing-out portion 23 is configured to rotate downward through the hinge 27.

That is, the drawing-out portion 23 rotates downward based on the hinge 27 in the state in which the storage case 20 is drawn-out to further increase the storage space 21 by using the space above the support tray 22 and the space above the rotated drawing-out portion 23 and as a result, the long article may also be loaded.

Further, the bottom surface of the guide bracket 30 mounted under the drawing-output portion 23 is protrudedly formed with a stopper 34. The stopper 34 may be made of an elastic material so as to perform a buffering role. Further, the other end of the guide bracket 30 is formed to be bent downward so as to contact the stopper 34 when the drawing-out portion 23 rotates or is configured so as to contact the stopper 34 by modifying the shape of the support bracket 33. In this case, the rotating operation of the hinge 27 may be regulated by the separate locking apparatus.

In addition, when the drawing-out portion 23 rotates downward, the opened top surface of the tray cover 24 provided at both sides of the hinge 27 and the top surface of the inside of the guide bracket 30 are configured so as to have a flat shape, thereby more stably storing and loading the articles put on the storage case 20.

In this case, the flat structure on the top surface of the above-mentioned storage case 20 may be formed by controlling the maximum rotating angle of the structure of the hinge 27 o by controlling the contact interval with the support bracket 33 or the guide bracket 30 according to the length of the stopper 34.

Meanwhile, as shown in FIG. 3, according to various embodiments of the present invention, the inner space in front of the rear bumper 10 is provided with a rear floor panel 13, the rear floor panel 13 is provided with a guide rail mechanism 40, and the top portion of the guide rail mechanism 40 is mounted with the storage case 20 to be mounted above the back beam 11. In this case, the guide rail mechanism 40 may be an LM guide.

That is, the bottom portion of the rear floor panel 13 may be mounted with the guide rail 41 and may be coupled with a saddle 42 guided by the guide rail 41 so as to implement a linearly reciprocal movement. Meanwhile, the top portion of the saddle 42 is directly coupled with the storage case 20 or is coupled with the storage case 20 through a separate connection bracket so that the storage case 20 may be mounted above the back beam 11.

Therefore, the storage case 20 may penetrate into the inside of the vehicle or may be provided so as to be drawn-out and drawn-in to the top portion of the rear bumper 10 without interfering with the back beam 11, thereby optimizing the layout of the storage apparatus.

In addition, the saddle 42 or the separate connection bracket contacts the front surface of the back beam 11 and is supported thereto at the time of drawing-out the storage case 20, such that the saddle 42 or the connection bracket may serve as the stopper preventing the storage case 20 from being excessively drawn-out.

As set forth above, various embodiments of the present invention can maximize the article storage function by increasing the storage space in the vehicle by mounting the storage case having the storage space in the space provided above the rear bumper and supporting the storage case above the back beam to be drawn-out to the outside.

In addition, various embodiments of the present invention can greatly improve the value of commodities of the vehicle by drawing-out the storage case to the outside and using the bumper cover as the step or the bench at the time of opening the storage case while configuring the top surface of the bumper cover so as to have the predetermined width.

In addition, various embodiments of the present invention can optimize the layout of the storage apparatus capable of firmly supporting the load applied to the storage apparatus during the drawing-out and drawing-in of the storage case by simultaneously fixing the guide bracket to the rear end panel and the back beam and preventing the storage case from interfering with the back beam or intruding into the vehicle by mounting the storage case above the back beam.

Further, various embodiments of the present invention can further increase the storage space by rotating the drawn-out portion downwardly based on the hinge in the state in which the storage case is drawn-out while using the space above the support tray and the space above the rotated drawing-out portion together and effectively store and load the long articles.

For convenience in explanation and accurate definition in the appended claims, the terms front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A storage apparatus for a vehicle, comprising:
a rear bumper having a lower back beam;
a storage case telescopically mounted in a space above the rear bumper, the storage case including an external portion having a shape that conforms with an outer surface of the rear bumper, wherein the storage case is drawn-out to an open position in which a storage space of the storage case is supported above the back beam; and a guide bracket provided in the space above the rear bumper in a state of covering and supporting a portion of the storage case and mounted so as to be supported to the rear end panel and the back beam;

wherein a bottom surface of the guide bracket is mounted to be seated to a top end of the back beam, a front surface of the guide bracket is mounted to be supported to a rear end panel, and a top portion of the guide bracket is mounted to be support to a top portion of the rear bumper.

2. The storage apparatus for a vehicle of claim 1, wherein the storage case includes:

a support tray defining the storage space and slidably movable while supported above the back beam; and a drawn-out portion positioned at an end of the support tray and including a predetermined width to provide a step or a bench when the storage case is in the open position.

3. The storage apparatus for a vehicle of claim 2, wherein the drawn-out portion includes:

a tray cover mounted above the support tray and providing a space communicating with the storage space; and a bumper cover mounted so as to cover the outside of the tray cover and finished so as to coincide one end and the other end thereof with the outer surfaces above and under the rear bumper, respectively.

4. The storage apparatus for a vehicle of claim 3, wherein a buffer space is provided between the tray cover and the bumper cover.

5. The storage apparatus for a vehicle of claim 1, wherein one end of the guide bracket is provided with a stopper portion to be bent downward to support the inside of the storage case at the time of drawing-out the storage case.

6. The storage apparatus for a vehicle of claim 1, wherein the other end of the guide bracket is provided with a load support portion to extend backward, thereby supporting a load of the storage case at the time of drawing-out the storage case.

7. The storage apparatus for a vehicle of claim 6, further comprising a support bracket mounted to be fixed to the bottom surface of the load support portion and the rear surface of the back beam so as to support the load of the storage case.

8. The storage apparatus for a vehicle of claim 2, wherein a support tray is provided with a hinge at a boundary portion with the drawn-out portion and the drawn-out portion rotates downward through the hinge.

9. The storage apparatus for a vehicle of claim 8, wherein a bottom surface of the guide bracket mounted under the drawn-out portion is formed with a protruding stopper.

10. The storage apparatus for a vehicle of claim 8, wherein when the drawn-out portion rotates downward, an opened top surface of the tray cover provided at both sides of the hinge and a top surface of the inside of the guide bracket have a flat shape.

11. The storage apparatus for a vehicle of claim 1, wherein an inner space in front of the rear bumper is provided with a rear floor panel, the rear floor panel is provided with a guide rail mechanism, and a top portion of the guide rail mechanism is mounted with the storage case to be mounted above the back beam.

* * * * *